UNITED STATES PATENT OFFICE.

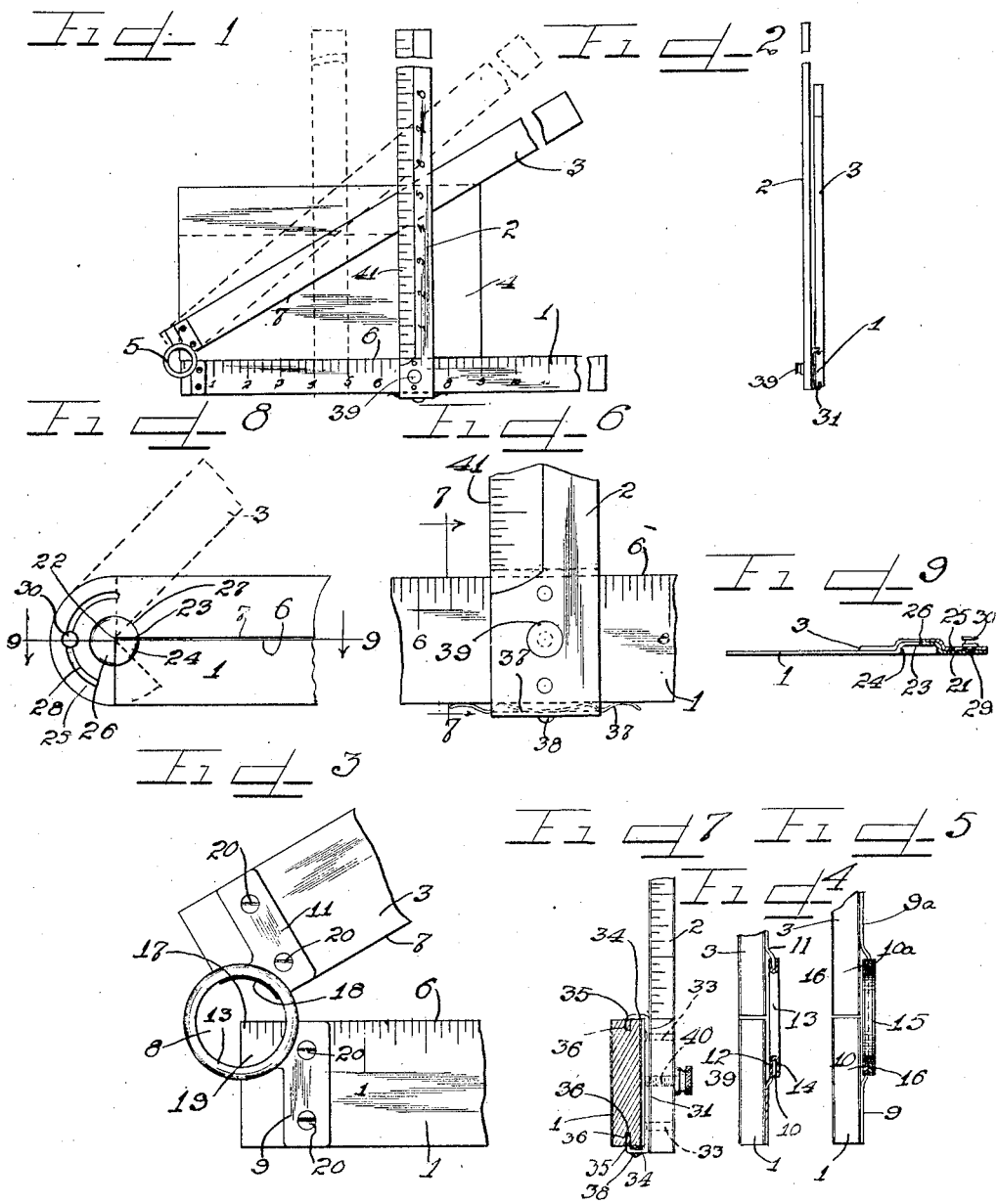

HENRY L. FISCHACHER, OF CHICAGO, ILLINOIS.

PROPORTIONAL MEASURING INSTRUMENT.

1,330,069.  Specification of Letters Patent.  Patented Feb. 10, 1920.

Application filed December 12, 1917. Serial No. 206,737.

*To all whom it may concern:*

Be it known that I, HENRY L. FISCHACHER, a citizen of the United States, and a resident of the city of Chicago, in the county of Cook and State of Illinois, have invented certain new and useful Improvements in Proportional Measuring Instruments; and I do hereby declare that the following is a full, clear, and exact description of the same, reference being had to the accompanying drawings, and to the numerals of reference marked thereon, which form a part of this specification.

This invention has reference to an adjustable instrument for determining the relative proportions of a photograph, drawing, or other article, in an enlarged or diminished size, and the instrument is preferably provided with graduations suitably marked so that a reading of the dimensions determined may be taken directly from the instrument itself.

The object of the invention is to provide an instrument for determining proportional dimensions, more readily and with greater accuracy than with instruments previously known.

Another object of the invention is to provide a proportional measuring instrument having pivotally related parts with an axial construction to permit visible placing of the zero point of the scale which is at the axis of the parts accurately at the point on the photograph or other object from which the determination of the proportion is to be made.

Another object of the invention is to provide a proportional measuring instrument with a pair of hinged members suitably connected so that an opening is provided at the axis of the hinge for the purpose of visibly locating the axis of the hinged members at a desired point from which the measurement or proportion is to be determined.

A further object of the invention is to provide a proportional measuring instrument having hinged members with a hinge having an opening therethrough at the axis of the hinge and means at the opening for indicating the axis of the hinge in order that the scale may be placed accurately, so that the axis of the hinge registers with the point from which the proportional measurements are to be taken.

A further object of the invention is to provide a proportional measuring instrument with a sliding member having means in continual frictional engagement whereby the sliding member may be freely adjusted and securely held in positions of adjustment.

A further object of the invention is to provide a proportional measuring instrument which is collapsible into a compact condition and which may be quickly assembled for use.

Other and further important objects of the invention will be apparent from the disclosure in the drawings and specification.

The invention (in a preferred form) is illustrated in the drawings and hereinafter more fully described.

In the drawings:

Figure 1 is a face view of the proportional measuring instrument placed in operative position on a rectangular object so as to determine proportional measurement thereof.

Fig. 2 is an edge view of the instrument shown in Fig. 1, looking at the right hand side of Fig. 1.

Fig. 3 is an enlarged view of the hinge shown in Fig. 1.

Fig. 4 is a sectional view of the hinge shown in Fig. 3 showing one form in which the hinge may be made.

Fig. 5 is a similar view of another form in which this hinge may be made.

Fig. 6 is an enlarged view showing the sliding connection of parts shown in Fig. 1.

Fig. 7 is a sectional view on the line 7—7 of Fig. 6.

Fig. 8 is an enlarged view of a modified form of hinge which is especially applicable to instruments made of metal.

Fig. 9 is a sectional view on the line 9—9 of Fig. 8.

As shown on the drawings:

The reference numeral 1, indicates the base or main portion of the measuring instrument, as it is upon this portion that the movable parts of the instrument are mounted and adjustable for determining proportions. Mounted on the base 1, so as to slide longitudinally thereof, and occupy at all times a perpendicular position thereon, is the part 2, which we will call the sliding section of the instrument. It is not essential that the sections 1 or 2, shall be graduated as they may be adjusted to determine proportions of the object, and the distance indicated thereby may be measured, if desired, by a separate instrument. However, it is preferable that these sections be graduated, as it renders the instrument much more convenient as it may be set at dimensions indicated by the scale and reading of proportions can be taken directly from the graduations on the scale.

Pivotally connected, preferably at the left hand end of the base 1, is the hypotenuse section 3, which may or may not be graduated, as desired. In the usual uses for which this instrument is designed, graduations are not necessary, but if it is desired to determine the distance along the hypotenuse section, it may readily be marked with graduations for that purpose.

This instrument is designed especially with the view of its being used in making cuts or reproductions from pictures or other articles upon an enlarged or diminished scale and is useful if one dimension of the reduction or enlargement is known for determining the other dimension of such reduction or enlargement. The graduations on the base 1, and the graduations on the sliding section 2, are arranged along the edges thereof next to the hypotenuse section 3, being numbered on the section 1, from the end to which the hypotenuse section 3, is pivoted, and being numbered on the sliding section 2, from the upper edge of the base 1.

Let us suppose that 4, represent a photograph or other article which is to be reduced or a cut made therefrom, the length of which cut or reproduction is to be 6½ inches, and it is desired to know the width of the reproduction or cut when so reduced.

The instrument is placed as shown in Fig. 1, so that the graduated edge of the base member 1, extends along the lower edge of the article 4, and the zero point of the base 1, registers with the left hand edge of the article 4. The sliding member 2, is then adjusted or may previously have been adjusted so that the edge thereof is at the 6½ inch mark on the base 1. The hypotenuse section 3, is then swung on its pivot so that the lower edge thereof registers with the upper right hand corner of the article 4, as shown in Fig. 1. The distance from the upper edge of the base 1, to the point where the lower edge of the hypotenuse section 3, intersects the left hand edge 41, of the sliding member 2, is the width of the reduction or cut made from the article 4, if the length thereof is 6½ inches and this dimension may be measured by reading the graduation on the sliding section 2, which in the present instance is a little over 3¾ inches.

It will be readily understood that in order to accurately determine proportions by means of an instrument of this character the point of intersection of the measuring edges of the sections 1 and 3, which in the present instance are the upper edge of the section 1, and the lower edge of the section 3, must be placed exactly at the lower left hand corner of the article 4, and it is preferable that the intersection of these lines be made concentric with the pivotal axis of the members 1 and 3, as this will enable the operator to initially place the section 1, in position and determine the desired measurement by merely swinging the hypotenuse 3, until the measuring edge thereof registers with the upper right hand corner of the article 4. If the intersection of the measuring edges of the members 1 and 3, are not concentric with the pivotal axis of the said members, adjustment of the pivoted hypotenuse member 3, will continually change the relation of the intersecting point of the measuring edges of the members 1 and 3, and it will be necessary to continually shift the entire instrument whenever a change is made in the adjustment of the hypotenuse member 3, so as to bring the intersection of the measuring edges of the sections 1 and 3, exactly at the lower left hand corner of the article 4, in order that an accurate measurement may be obtained.

With a view of obviating this difficulty, I have provided a hinge member which is indicated generally at 5, to which the members 1 and 3, are connected in such a manner that the measuring edge 6, of the base 1, is in alinement with the axis of the hinge and also so that the measuring edge 7, of the hypotenuse member 3, is similarly in alinement with the axis of the said hinge member, so that the intersection of the lines of these measuring edges is at all times coincident with the axis of the hinge.

In order to further facilitate the placing of the instrument, in the proper position, I provide a particular form of hinge which will give vision at the axis of the hinge and consequently the intersection of the lines 6 and 7, so that the instrument may be placed accurately so that the lower left hand corner of the article 4, is at the axis of the hinge part and consequently at the intersection of the lines 6 and 7, which is the required position to correctly determine the proportion.

One form of this hinge which is indicated in Figs. 1, 3, 4 and 5, consists of inter-engaging ring portions on the sections 1 and 3, having a central opening indicated at 8. This arrangement may be provided as shown in Fig. 4, by forming the hinge member 11, with a ring portion 10, and the other hinge member 9, with a corresponding ring portion 12, having a flange 13, extending inside the ring portion 10, and turned over the top thereof as at 14, so as to provide a circular annular groove in which the ring portion 10, is designed to slide for providing pivotal connection of the hinge member 9, with the hinge member 11.

This hinge construction may also be effected as shown in Fig. 5, by providing correspondingly constructed right and left hand hinge members 9 and 9ª, with matching ring portions 10 and 10ª, which are clamped together by means of the flanged ring 15, encircled by the rings 10 and 10ª, and provided with outturned flanges 16, which clamp the ring portions 10 and 10ª, therebetween, and permit independent circular movement of the said ring portions.

The end of one of the sections 1 or 3, is extended so that one of the corners 17, thereof is at the pivotal axis of the hinge members 9 and 11, and the end of the other of said sections 1 or 3, is cut away inside the ring portion as shown at 18, in Fig. 3, so as to provide an unobstructed space adjacent the corner 17, for placing the instrument in the proper position, it being preferable to cut away the corner of the hypotenuse section 3, and project the corner 19, of the base section 1, within the hinge ring as shown to afford a measuring indicator.

The construction shown in Figs. 1, 3, 4 and 5, is indicated as having the hinge separable from the members 1 and 3, and attached thereto by means of the screws 20, although the hinge part may be formed integral with the sections 1 and 3, if desired.

I have also shown a modified form of hinge connection which is illustrated as applied to metal sections 1 and 3, and made integral therewith. In this form of hinge connection, the end of the section 1, is provided with a semi-circular extension 21, formed about the point 22, as an axis which said point is the end of the upper edge 6, of the section 1, and a circular boss 23, is formed about the point 22, as an axis or any other construction may be provided to provide an upright flange 24, for centering the members 1 and 3. The member 3, is provided with a corresponding semi-circular portion 25, formed about the point 22, as an axis so that the point 22, is at the left hand end of the measuring edge 7. This semi-circular portion 25, is provided likewise with a boss 26, or other construction so as to have a flange 27, embracing the flange 24, of the base section 1, and there is a semi-circular slot 28, formed around the center 22, through which is passed the stem 29, which is threaded in to the semi-circular portion 21, of the base section 1, the upper end of the stem 29, being provided with a knob 30, which overlaps the edges of the slots 28, and holds the parts of the sections 1 and 3, together. This threaded member 29, may be turned by means of the knob 30, to adjust the frictional tension of the semi-circular portions 21, and 25, for holding them in any position to which they may be adjusted. The pin 29, may be permanently secured to the bottom semi-circular portion 21, if desired and the knob 30, may have a threaded connection with the upper end of the said pin 29, above the semi-circular portion 25, it being essential only that some means be provided for holding the parts 1 and 3, in hinged relation with the desired amount of frictional engagement so that they will remain in the positions to which they are adjusted.

The sliding member 2, in the construction shown in the drawings, has the lower end thereof laid over the base 1, with a clip 31, intermediate, the said clip being fixed to the lower end of the section 2, by the pins 33, or other suitable means. This clip has the ends thereof bent to embrace the edges of the section 1, as shown at 34, and turned in as at 35, to engage grooves 36, arranged longitudinally one in each edge of the base 4, whereby the clip 31, and section 2, are retained on the member 1, and capable of sliding lengthwise thereof. The portion 34, of the clip 31, at the upper edge of the base 1, is accurately adjusted with the member 2, so that when held in contact with the upper edge 6, of the member 1, the section 2, will be exactly perpendicular to the base 1, and for the purpose of holding the portion 34, constantly in contact with the edge 6, of the member 1, the portion 34, at the bottom edge of the member 1, is spaced a short distance therefrom and a plate spring 37, interposed between the portion 34, and the lower edge of the member 1, so as to hold the upper turned portion 34, of the clip 31, in close frictional engagement with the edge 6, of the member 1. The ends of this spring 37, are preferably projected beyond the side of the clips 31, and bent somewhat as shown to provide a leverage for holding the member 2, in the perpendicular position and are also curved and extended to facilitate placing of the section 2, in position on the section 1, after it has been withdrawn therefrom. This spring 37, is held by means of a rivet 38, which connects the spring with the lower strip 34. A knob 39, may be provided having a threaded stem 40, screwed into the end of the section 2, and into the clip 31, to provide a convenient grip for moving the sliding member 2, along the member 1.

The slots 36, in the member 1, extend entirely to the free end of the member 1, and the sliding member 2, may be withdrawn therefrom to fold the instrument in a compact form. The member 3, is folded down against the member 1, and the member 2, may be laid on top thereof, so that it will be in convenient form for carrying.

It is obvious that details of construction may be varied through a wide range, and I do not purpose limiting the patent granted otherwise than necessitated by the prior art.

I claim as my invention:

1. A measuring instrument comprising a pair of members, hinge means pivotally connecting said members and formed to provide an opening at the axis of said hinge, one of said members cut away at the pivot corner thereof within said hinge opening to permit the pivot corner of the other member to serve as an indicator, and a member perpendicular to one of the members and slidable thereon adapted to intersect the other member.

2. A measuring instrument comprising a base member, a hypotenuse member, a perpendicular member slidable on said base member and adapted to intersect said hypotenuse member, interfitting hinge members pivotally connecting said base member and said hypotenuse member, said hinge members affording a sight opening at the pivotal axis of said base member and said hypotenuse member, said hypotenuse member having the pivot corner thereof cut away to permit the pivot corner of the base member to project into the sight opening to afford a visible indicator.

3. A measuring instrument comprising a base member, a perpendicular member slidably mounted thereon, a hypotenuse member, ring hinge members secured, respectively, on said base member and on said hypotenuse member, one of said ring hinge members projecting through and flanged over the other ring hinge member for frictionally holding said base member and said hypotenuse member pivotally connected together with the pivot corner of the base member visible through the interfitting ring hinge members and coincident with the axis thereof, the pivot corner of the hypotenuse member cut away within the hinge rings to permit the pivot corner of said base member to be used as an indicator.

In testimony whereof I have hereunto subscribed my name in the presence of two subscribing witnesses.

HENRY L. FISCHACHER.

Witnesses:
EARL M. HARDINE,
CHARLES W. HILLS, Jr.